(12) United States Patent
Lee

(10) Patent No.: US 8,365,657 B2
(45) Date of Patent: Feb. 5, 2013

(54) GRINDING TYPE JUICE EXTRACTOR

(76) Inventor: Wen Ching Lee, Taichung (TW)

( * ) Notice: Subject to any disclaimer, the term of this patent is extended or adjusted under 35 U.S.C. 154(b) by 443 days.

(21) Appl. No.: 12/700,084

(22) Filed: Feb. 4, 2010

(65) Prior Publication Data

US 2011/0185921 A1 Aug. 4, 2011

(51) Int. Cl.
*A23N 1/00* (2006.01)
*A23N 1/02* (2006.01)
*B26D 1/00* (2006.01)
*A47J 19/02* (2006.01)

(52) U.S. Cl. ............ 99/509; 99/510; 99/513; 241/278.1

(58) Field of Classification Search ............ 99/509, 99/510, 513; 241/278.1
See application file for complete search history.

(56) References Cited

U.S. PATENT DOCUMENTS

| | | | | | |
|---|---|---|---|---|---|
| 818,445 | A | * | 4/1906 | Holton | 99/513 |
| 1,962,856 | A | * | 6/1934 | Benson | 99/501 |
| 3,101,758 | A | * | 8/1963 | Carroll et al. | 99/503 |
| 4,569,280 | A | * | 2/1986 | D'Ambro et al. | 99/538 |
| 4,941,403 | A | * | 7/1990 | Cimenti | 99/492 |
| 5,454,298 | A | * | 10/1995 | Lu | 99/483 |
| 5,669,289 | A | * | 9/1997 | Chen | 99/511 |
| 5,761,993 | A | * | 6/1998 | Ling et al. | 99/510 |
| 5,778,769 | A | * | 7/1998 | Dodson | 99/536 |
| 5,960,709 | A | * | 10/1999 | Yip | 99/510 |
| 6,397,736 | B1 | * | 6/2002 | Tseng et al. | 99/511 |
| 6,543,340 | B1 | * | 4/2003 | Fouquet | 99/511 |
| 6,813,997 | B1 | * | 11/2004 | Lin | 99/511 |
| 6,862,982 | B1 | * | 3/2005 | Wang | 99/511 |
| 7,481,155 | B2 | * | 1/2009 | Larsen | 99/511 |
| 2005/0068847 | A1 | * | 3/2005 | Sands | 366/205 |
| 2005/0188860 | A1 | * | 9/2005 | Lin | 99/511 |
| 2006/0260478 | A1 | * | 11/2006 | Hsu | 99/495 |
| 2008/0202355 | A1 | * | 8/2008 | Krall et al. | 99/513 |
| 2010/0050886 | A1 | * | 3/2010 | Obersteiner et al. | 99/507 |

* cited by examiner

*Primary Examiner* — Sebastiano Passaniti
(74) *Attorney, Agent, or Firm* — Rosenberg, Klein & Lee

(57) ABSTRACT

A grinding type juice extractor includes upper and lower grinding rings for providing both grinding and rolling effects during a process of extracting juice, and food materials are inputted for extracting juices, and the upper and lower grinding rings correspond to each other to define a clamping status, such that the inputted food material can be grinded, and a mechanism or method of applying two kinds of physical forces to the food material can be used for extracting the juice of the food material and maximizing the juice yield. In addition, a filter surface of a filter ring is provided for filtering the juice, and a juice outlet tube installed to a middle seat is provided for outputting the juice. Such juice extractor can improve the juice yield and reduce waste of resources.

9 Claims, 6 Drawing Sheets

GRINDING TYPE JUICE EXTRACTOR

BACKGROUND OF THE INVENTION

1. Field of the Invention

The present invention relates to a juice extractor, and more particularly to a juice extractor having the grinding and squeezing functions concurrently.

2. Description of the Related Art

To extract juice inside a food material by an effort-saving operation, a juice extractor or a juice machine (not limited for the use of extracting fruit juices only) is generally used, wherein most juice extractors have a press mechanism for pressing the food material (including but not limited to a fruit) and squeezing juice out from the food material, and most juice machines have a rotary knife for cutting and blending the food material into a paste form, such as squeezing the juice out from the fruit or blending the fruit into a fruit paste. Some dieters may add water and condiments to produce a fruit juice, and others may blend corps such as soybeans, yellow beans or vegetables with water and condiments by a high-speed rotating knife to produce drinks such as soya milk and vegetable juices. Regardless of the juice extractor or the juice machine, the main concern is to fully extract the juice from the food material without waste.

A household juice machine disclosed in P.R.C. Pat. Application No. 200520120453.4 comprises a machine base, a motor, a blending cup, a juice cup, a residue cup and a feeder, wherein the motor is installed onto the machine base, and the blending cup includes a planar gear knife disk installed therein, and the planar gear knife disk is coupled to a motor axle by its thread, and the feeder is covered onto the top of the blending cup, and teeth of the gear knife of the planar gear knife disk are arranged radially with an inclined angle in a clockwise direction. The juice machine having a knife disk structure provides high-speed cutting and squeezing, without requiring a pushing rod to complete the process of squeezing juice. However, the aforementioned structure of the knife disk has the following drawbacks. During a high-speed rotation of the knife disk, juices in large chunks of fruit flesh or vegetable are not squeezed out completely at a preliminary cutting stage, and the large chunks are spun out from the knife disk into the residue container at the periphery of the knife disk due to centrifugal force, and thus giving rise to a low juice yield and a waste of raw material.

SUMMARY OF THE INVENTION

In view of the shortcomings of the prior art, the inventor of the present invention based on years of experience in the related industry to conduct extensive researches and experiments, and finally developed a grinding type juice extractor in accordance with the present invention.

Therefore, it is a primary objective of the present invention to overcome the aforementioned shortcomings and deficiencies of the prior art by providing a grinding type juice extractor to improve the juice yield and save the raw materials.

To achieve the foregoing objective, the present invention provides a grinding type juice extractor comprising: a middle seat, with both ends in an open form, and a hollow area interconnected with a juice outlet tube and the hollow area; a filter member, being in a circular shape, contained inside the middle seat, and having a circular filter surface, and the circular filter member having a lower grinding ring with a rough surface disposed around an internal periphery of the circular filter member; a cover, installed to the top of the middle seat, and having an upper grinding ring installed to the bottom of the cover, and the upper grinding ring corresponding to the lower grinding ring to define a clamping status of an internal periphery of the filter member, and the cover having an opening passage with both penetrating ends and penetrated from the top of the cover into the circular hole of the upper grinding ring, and a push rod, movably inserted into the opening passage; and a main machine; having a link shaft passed through an opening formed at the bottom of the middle seat and coupled with the filter member in the hollow area.

In the present invention, the cover comprises: an opening passage with both penetrating ends and penetrated from the top of the cover to the circular hole of the upper grinding ring, such that food materials such as vegetables, fruits, yellow bean, and soybean can be inputted, and a push rod, movably inserted into the opening passage, for pressing the food material. With the upper grinding ring and the lower grinding ring installed corresponding to each other, a clamping status defined at the internal periphery of the filter ring can be used for defining a grinding status of the inputted food material to provide a way of squeezing and grinding the food material by a mechanism or method of applying two kinds of physical forces to maximize the juice yield of the food material and reduce a waste of resources. In addition, the filter surface of the filter ring is provided for extracting juice, and the juice is outputted from a juice outlet tube of the middle seat.

DETAILED DESCRIPTION OF THE PREFERRED EMBODIMENTS

The technical characteristics of the present invention will become apparent with the detailed description of the preferred embodiments and the illustration of the related drawings.

Figure 1:
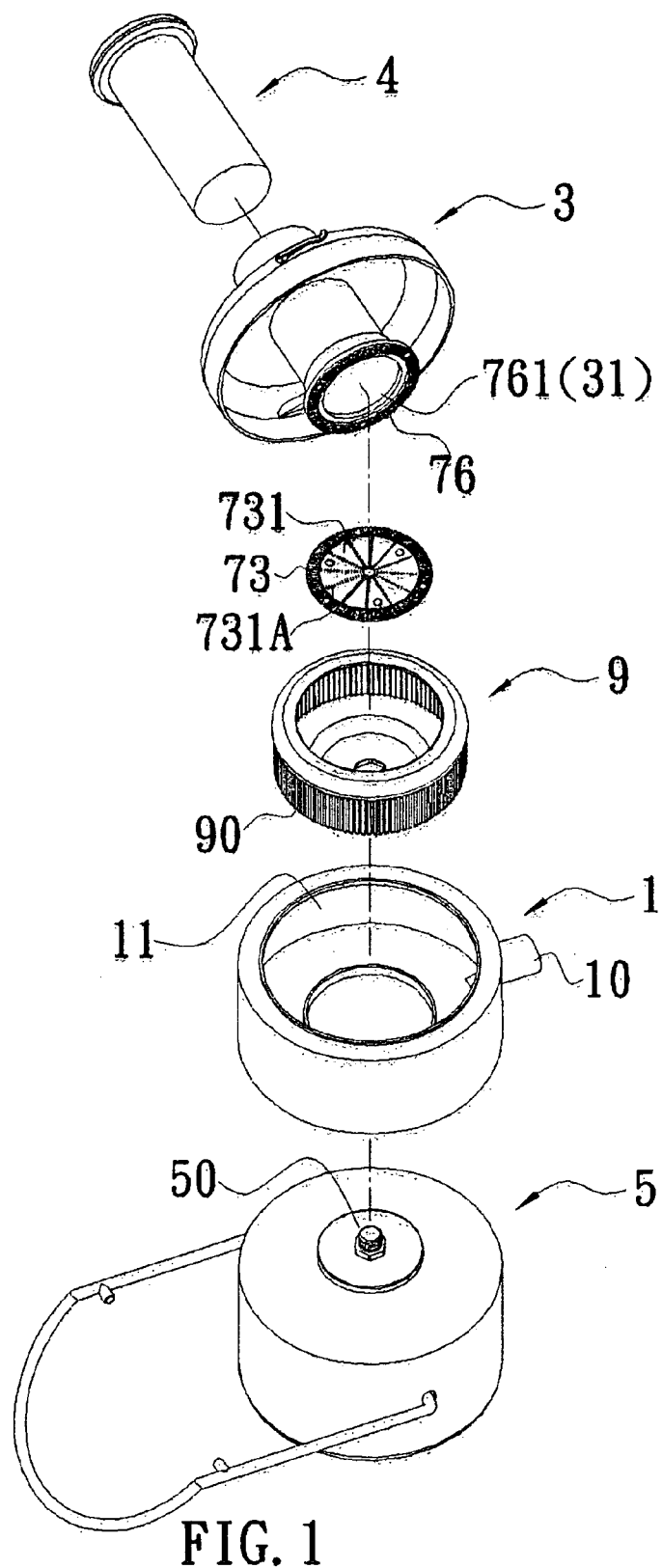
FIG. 1 is an exploded view of a grinding type juice extractor in accordance with a first preferred embodiment of the present invention.
Figure 2:
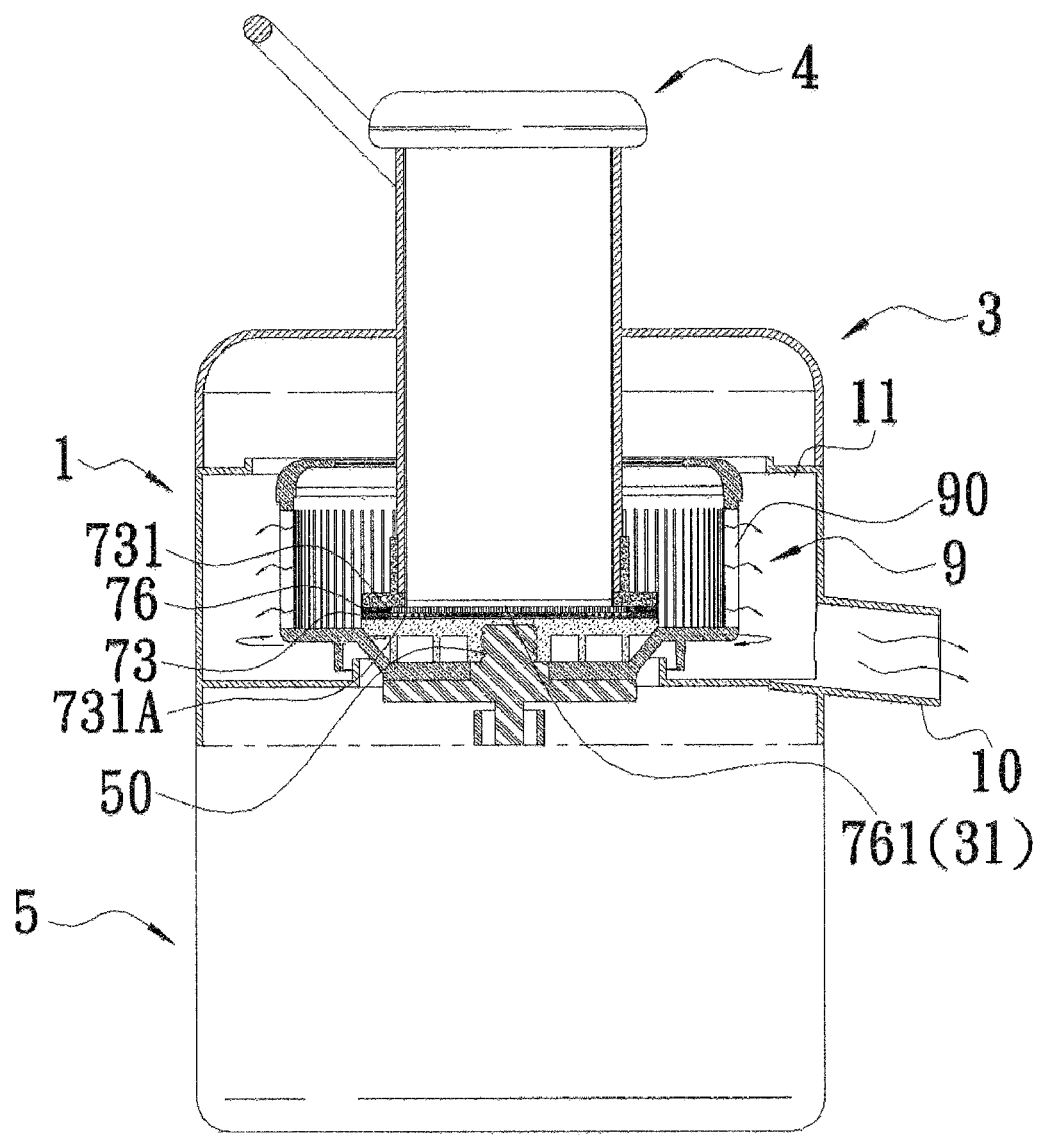
FIG. 2 is a cross-sectional view of an assembled grinding type juice extractor in accordance with a first preferred embodiment of the present invention.

With reference to FIGS. 1 and 2 for an exploded view and a cross-sectional view of a grinding type juice extractor in accordance with a first preferred embodiment of the present invention respectively, the grinding type juice extractor comprises:

a middle seat 1, with both ends in an open form, and having a hollow area 11 interconnected with a juice outlet tube 10 and the hollow area 11;

a filter member 9, being in a circular shape, contained inside the middle seat 1, and having a circular filter surface 90;

a lower grinding ring 73, coupled to an internal circular periphery of the filter member 9, and having a rough surface, such that a connecting element can be movably coupled to the filter member 9, and the movable connecting elements facilities a replacement or removal of the lower grinding ring 73, and a disk body 731 being formed on an internal side of the lower grinding ring 73, and a plurality of alternate knife teeth 731A formed at a top side of the disk body 731;

a cover 3, installed to the top of middle seat 1, and having an upper grinding ring 76 movably installed to the bottom of the cover 3 by a connecting element, wherein the movable connecting element facilitates a replacement or a removal of the upper grinding ring 76, and the upper grinding ring 76 and the lower grinding ring 73 corresponding to each other to define a clamping status of an internal periphery of the filter member 9, and the cover 3 having an opening passage 31 with both penetrating ends and penetrated from the top of the upper grinding ring 76 of the cover 3 into the circular hole 761, and a push rod 4, movably inserted into the opening passage 31; and a main machine 5, having a link shaft 50 passed through an opening formed at the bottom of the middle seat 1 and coupled with the filter member 9 in the hollow area 11.

Figure 3:
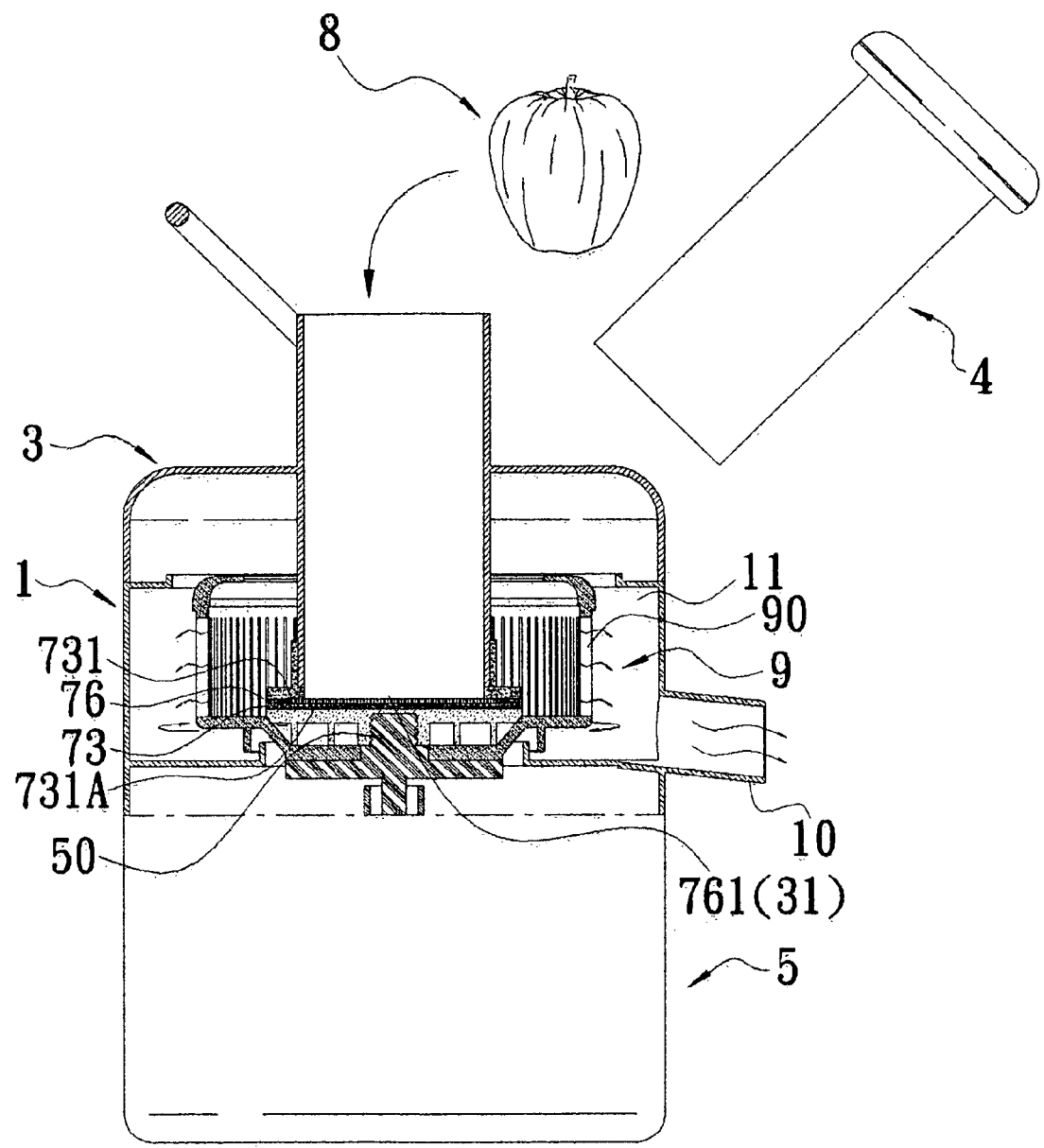
FIG. 3 is a schematic view of feeding a fruit into a grinding type juice extractor in accordance with a first preferred embodiment of the present invention.

With reference to FIG. 3, a food material 8, which is a fruit in this embodiment, can be inputted from the opening passage 31 of the cover 3 after the push rod 4 is movably removed, and the food material 8 will fall into the bottom position of the opening passage 31, and then the push rod 4 is movably inserted into the opening passage 31 to press and squeeze the food material 8 in order to extract juice out from the food material 8. In this preferred embodiment, a disk body 731 is formed on an internal side of the lower grinding ring 73, and the disk body 731 includes a plurality of alternate knife teeth 731A formed at a top side of the disk body 731, the squeezing effect as well as the knife teeth 731 destructs the structure of the food material 8 to extract juice more effectively.

To extract juice, the present invention provides the upper grinding ring 76 and the lower grinding ring 73 corresponding to each other to define a clamping status at an internal periphery of the filter member 9 for grinding the inputted food material 8. The mechanism or method of applying two kinds of physical forces for squeezing and grinding the food material to maximize the juice yield of the food material, and then a filter surface of the filter surface is provided for filtering the juice, and a juice outlet tube of the middle seat is provided for outputting the juice. Since the link shaft 50 of the main machine 5 is connected to the filter member 9, the filter member 9 can be rotated to drive the lower grinding ring 73 connected to an internal circular periphery of the filter member 9, so as to improve the juice yield and reduce a waste of resources.

Figure 4:
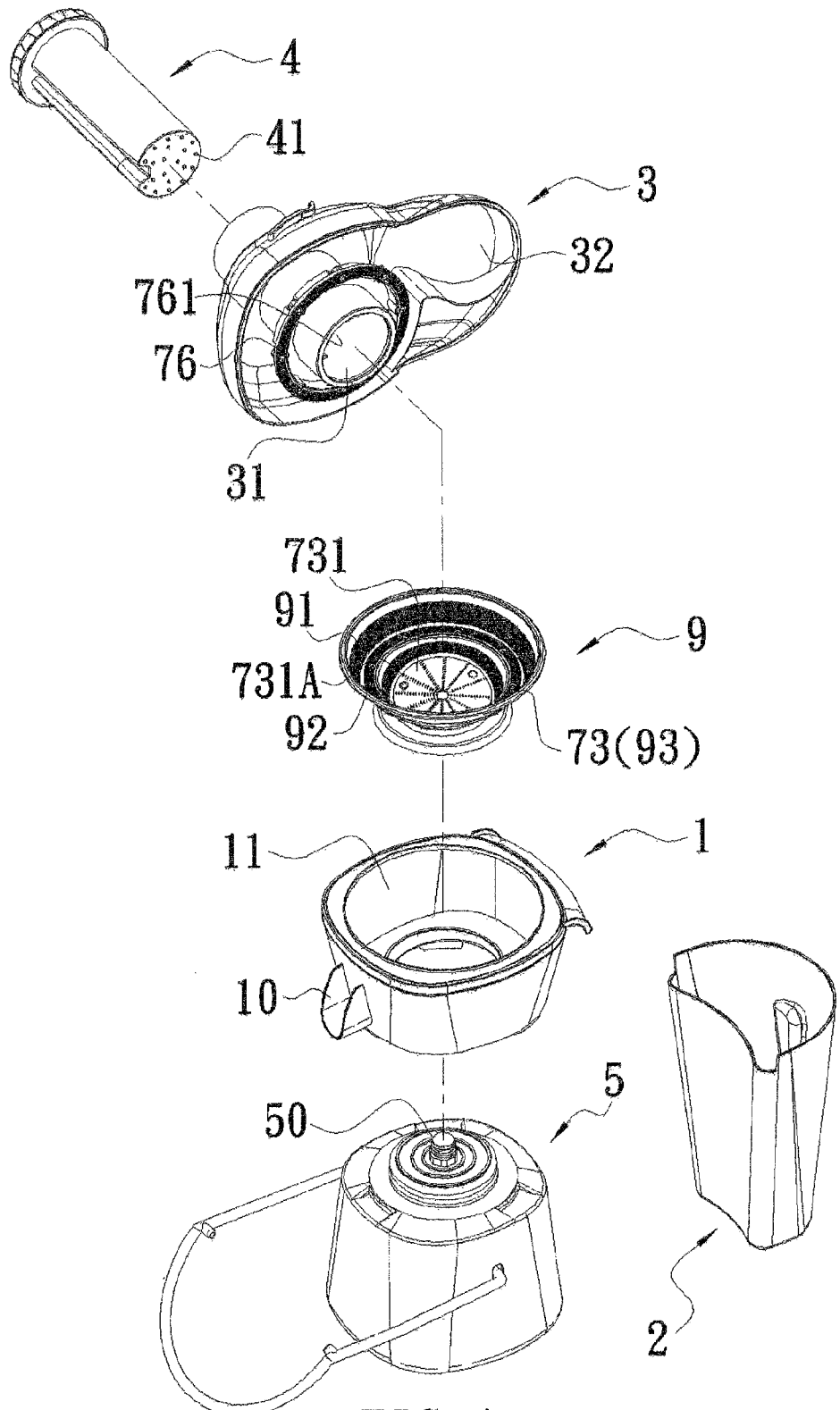
FIG. 4 is an exploded view of a grinding type juice extractor in accordance with a second preferred embodiment of the present invention.
Figure 5:
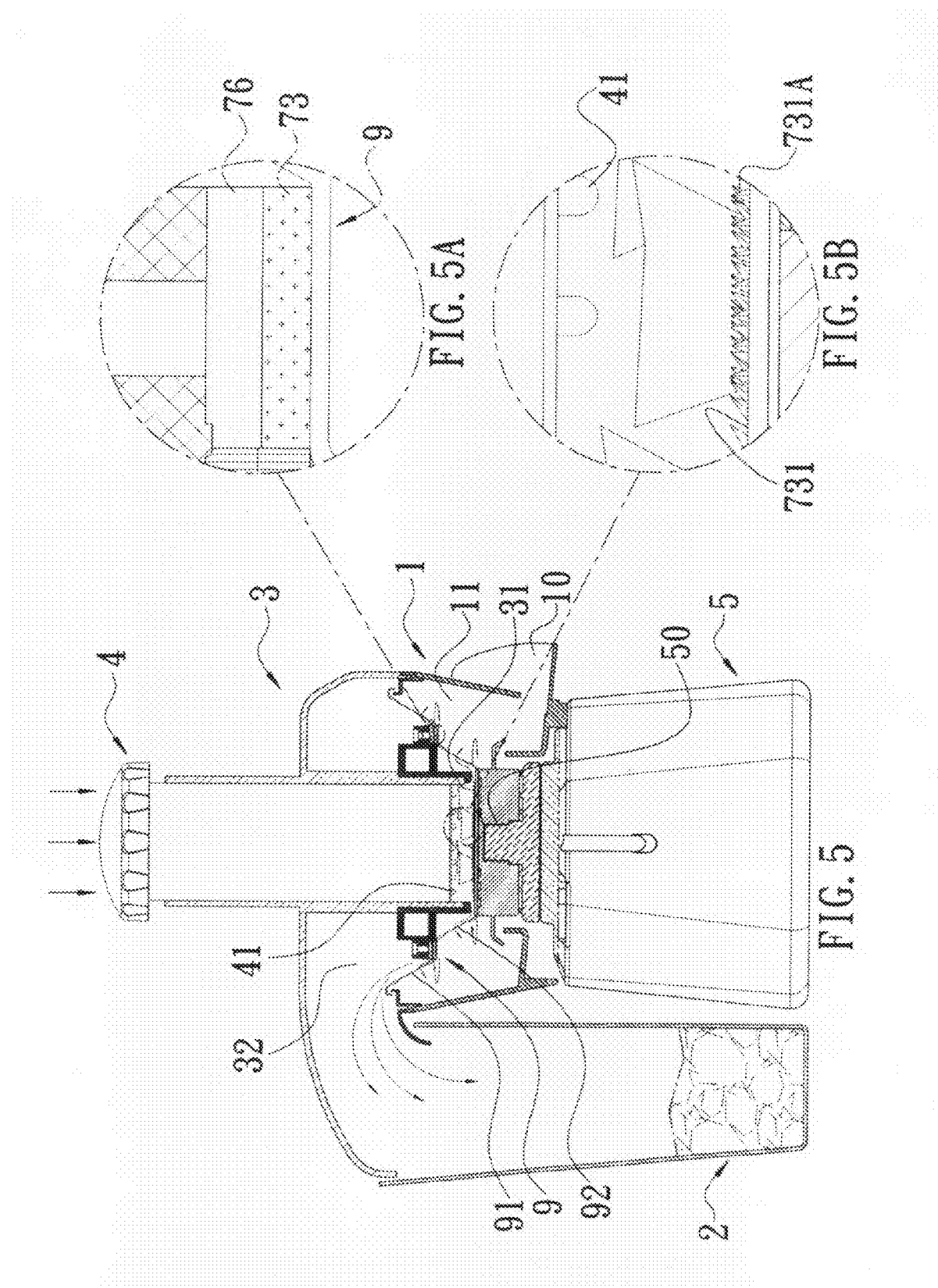
FIG. 5 is a cross-sectional view of an assembled grinding type juice extractor in accordance with a second preferred embodiment of the present invention.

With reference to FIGS. 4 and 5 for a preferred embodiment of the present invention, the grinding type juice extractor further comprises:

a middle seat 1, with both ends in an open form, and having a hollow area 11 interconnected with a juice outlet tube 10 and the hollow area 11;

a filter member 9, being in a circular shape, contained inside the middle seat 1, and having a lower grinding ring 73 with a rough surface and coupled to an internal circular periphery of the filter member 9, and linked integrally with the filter member 9, wherein the lower grinding ring 73 is installed at a middle section on an internal side of the filter member 9 for dividing the filter member 9 into upper and lower filter rings 91, 92, and a step rim 93 is formed between the upper and lower filter rings 91, 92 of the filter member 9, and the lower grinding ring 73 is installed on a surface of the step rim 93, and a disk body 731 is formed on a bottom side of the filter member 9, and the disk body 731 includes a plurality of alternate knife teeth 731A;

a cover 3, installed to the top of middle seat 1, and having an upper grinding ring 76 movably installed to the bottom of the cover 3 by a connecting element, and the upper grinding ring 76 and the lower grinding ring 73 corresponding to each other to define a clamping status of an internal periphery of the filter member 9, and the cover 3 having an opening passage 31 with both penetrating ends and penetrated from the top of the upper grinding ring 76 of the cover 3 into the circular hole 761, and a push rod 4, movably inserted into the opening passage 31, wherein the push rod 4 includes a plurality of protruding dots 41 formed at a bottom side of push rod 4, and the cover 3 includes a guide groove 32 formed at a bottom side of the cover 3 and having its bottom interconnected with the outside, and the guide groove 32 and the upper filter ring 91 are interconnected internally; and a main machine 5, having a link shaft 50 passed through an opening formed at the bottom of the middle seat 1 and coupled with the filter member 9 in the hollow area 11.

Figure 6:
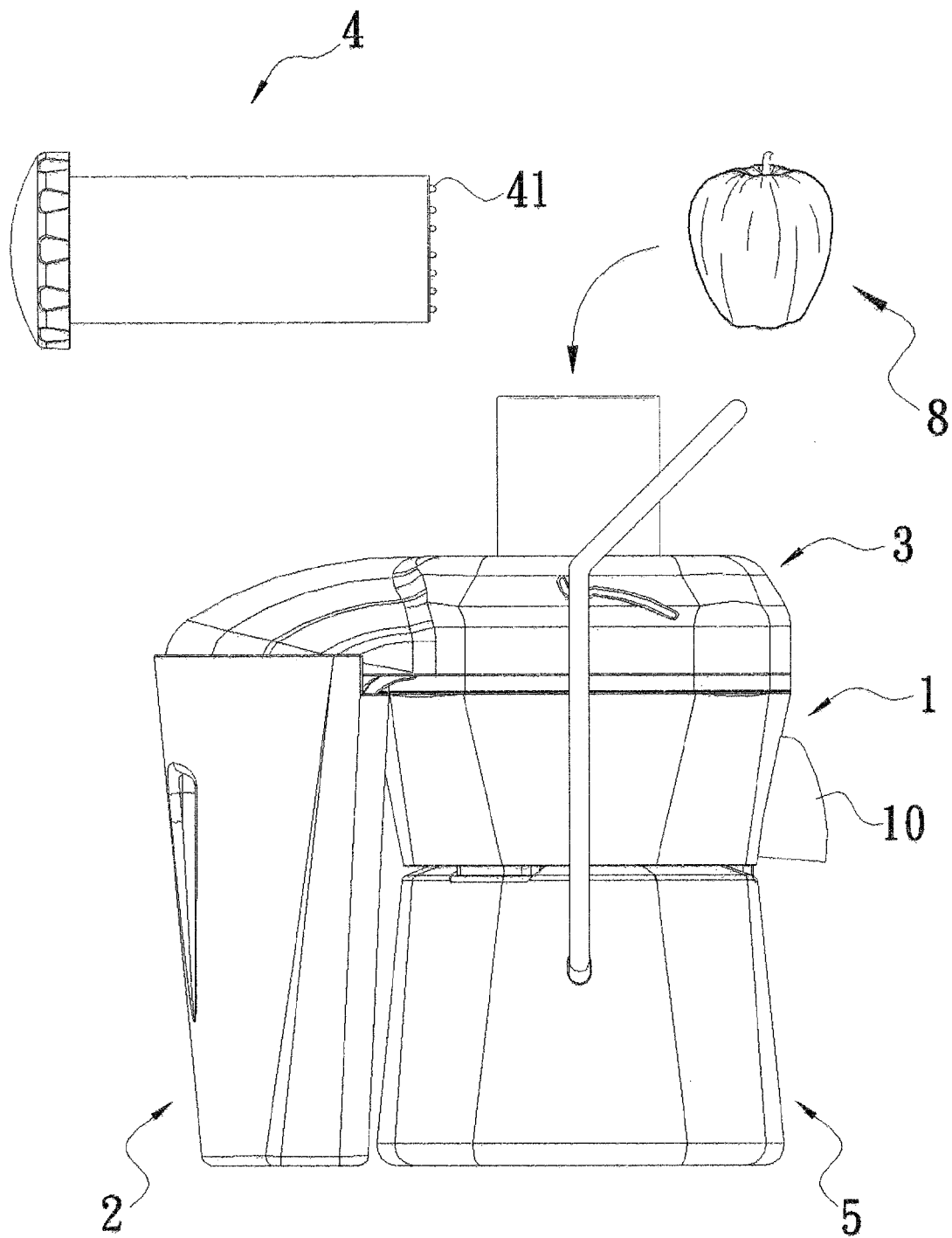
FIG. 6 is a schematic view of feeding a fruit into a grinding type juice extractor in accordance with a second preferred embodiment of the present invention.

With reference to FIG. 6, the food material 8, which is a fruit in this embodiment, can be inputted from the opening passage 31 of cover 3 after the push rod 4 is movably removed. With reference to FIG. 5 as well, the food material 8 will fall into a bottom position of the opening passage 31, and then the push rod 4 is movably inserted into the opening passage 31 to press the food material 8 and extract juice of the food material 8, so that the juice inside the food material 8 can be extracted. In this preferred embodiment, a disk body 731 is formed on an internal side of the lower grinding ring 73, and a plurality of alternate knife teeth 731A formed on a top surface of the disk body 731, the squeezing effect and the knife teeth 731A will destruct the food material 8, and the plurality of protruding dots 41 formed at the bottom side of the push rod 4 will improve the juice yield and reduce a waste of resources.

To extract the juice more effectively, the present invention provides the upper grinding ring 76 and the lower grinding ring 73 corresponding to each other to define a clamping status at an internal periphery of the filter member 9 for grinding the inputted food material 8, and applies two kinds of physical forces to the food material 8 to maximize the juice yield of the food material 8. In addition, the filter surface of the filter ring is provided for extracting juice, and the juice outlet tube 10 of the middle seat 1 is provided for outputting juice, and the link shaft 50 of the main machine 5 is connected to the filter member 9, such that the filter member 9 can be rotated to drive the lower grinding ring 73 connected to the internal circular periphery of the filter member 9, so as to improve the juice yield.

In this preferred embodiment of the present invention, the guide groove 32 formed at the bottom side of the cover 3 is interconnected to the outside, and the guide groove 32 corresponds to a containing cup 2 having an opening facing upward, and the guide groove 32 and the upper filter ring 91 are interconnected internally, so that the containing cup 2 can receive spilled juice and/or incompletely squeezed food material 8, and the incompletely squeezed food material can be inputted to the juice extractor for a further extraction, so as to improve the juice yield.

The present invention improves over the prior art and complies with patent application requirements, and thus is duly filed for the patent application. While the invention has been described by device of specific embodiments, numerous modifications and variations could be made thereto by those generally skilled in the art without departing from the scope and spirit of the invention set forth in the claims.

What is claimed is:

1. A grinding type juice extractor, comprising:
   a middle seat, with both ends in an open form, and a hollow area defined therebetween, the middle seat including a juice outlet tube communicating with the hollow area;
   a filter member, being in a circular shape, contained inside the middle seat, and having a circular filter surface extending from a floor portion to an upper rim portion, and the circular filter member having a lower grinding ring with a rough surface disposed within an internal periphery of the circular filter member raised above the floor portion;
   a cover installed to the top of the middle seat, and having an upper grinding ring installed to the bottom of the cover, the upper grinding ring corresponding to the lower grinding ring to define therewith an annular clamping grind structure within an internal periphery of the filter member, the cover having an opening passage extending from the top of the cover into the circular hole of the upper grinding ring, and a push rod movably inserted into the opening passage; and
   a main machine having a link shaft passed through an opening formed at the bottom of the middle seat and coupled with the filter member in the hollow area.

2. The grinding type juice extractor of claim 1, wherein the lower grinding ring includes a disk body formed on an internal side of the lower grinding ring, and the disk body includes a plurality of alternate knife teeth disposed at a top side of the disk body.

3. The grinding type juice extractor of claim 1, wherein the lower grinding ring includes a middle section disposed on an internal side of the filter member, and provided for dividing the filter member into upper and lower filter rings.

4. The grinding type juice extractor of claim 3, wherein the filter member includes a step rim formed between the upper and lower filter rings, and the lower grinding ring is installed on a surface of the step rim.

5. The grinding type juice extractor of claim 3, wherein the filter member includes a disk body disposed on a surface of the bottom of the filter member, and a plurality of alternate knife teeth formed at a top side of the disk body.

6. The grinding type juice extractor of claim 3, wherein the cover includes a guide groove formed at a bottom side to oppose the upper filter ring.

7. The grinding type juice extractor of claim 1, wherein the filter member includes a disk body disposed on a surface of the bottom of the filter member, and a plurality of alternate knife teeth formed at a top side of the disk body.

8. The grinding type juice extractor of claim 1, wherein the push rod includes a plurality of protruding dots formed at a bottom side of the push rod.

9. The grinding type juice extractor of claim 1, wherein the link shaft is driven by the main machine to actuate relative rotation between the lower and upper grinding rings.

* * * * *